Figure 1:
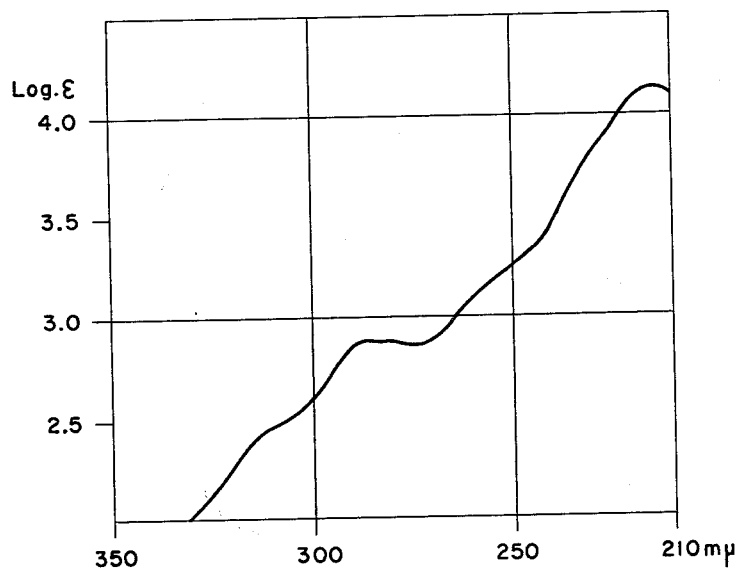

April 28, 1964     E. GAEUMANN ETAL     3,131,126

ANTIBIOTIC AND PROCESS FOR ITS MANUFACTURE

Filed July 15, 1960     2 Sheets-Sheet 2

ERNST GAEUMANN
VLADIMIR PRELOG
ERNST VISCHER
INVENTORS

United States Patent Office 3,131,126
Patented Apr. 28, 1964

3,131,126
ANTIBIOTIC AND PROCESS FOR ITS MANUFACTURE
Ernst Gaeumann and Vladimir Prelog, Zurich, and Ernst Vischer, Basel, Switzerland, assignors to Ciba Corporation, a corporation of Delaware
Filed July 15, 1960, Ser. No. 43,173
Claims priority, application Switzerland July 23, 1959
13 Claims. (Cl. 167—65)

The present invention provides a new antibiotic, hereinafter referred to as avilamycin derivatives and cleavage products thereof, as well as pharmaceutical preparations containing said compounds, and a process for the manufacture of said compounds and preparations.

The antibiotic avilamycin is formed by the cultivation of a new Actinocymetes strain of the genus Streptomyces, hereinafter referred to as *Streptomyces viridochromogenes* NRRL 2860. It was isolated from a soil specimen collected at Caracas, Venezuela, and is kept under the number A 23575 in our own laboratories as well as in those of the Federal Institute of Technology, Institute for Special Botanic, Zurich, and under the number NRRL 2860 at the United States Department of Agriculture, Northern Utilization Research and Development Division, Peoria, Illinois.

*Streptomyces viridochromogenes* NRRL 2860 forms a pale-blue air mycelium. The spore chains form numerous open, generally regular, spirals with monopodial branches and a long, straight main axis. The spores are elliptic to oval. The surface of the individual spores is covered with spikes about 0.2μ long which are broad at the base and form a tip. When grown on peptone-containing nutrients, the strain NRRL 2860 produces a dark melanoid coloration of the nutrient. The growth of the strain is relatively little dependent on the temperature; the fungus develops well both at 18° C. and at 40° C, but the optimum temperature ranges from 25 to 32° C.

To characterise the strain *Streptomyces viridochromogenes* NRRL 2860 further, its growth on a variety of nutrients is described below. The nutrients 1–7 and 10 were prepared as described by W. Lindenbein in Arch. Mikrobiol. 17, page 361 [1952].

(1) Synthetic agar: Growth initially thin, cloudy and white-yellow, subsequently wrinked and pale-yellow; air mycelium forms a dust-like coating, chalky white.

(2) Synthetic solution: Basic growth and sediment puntiform; milky white, rarely floccular sediment; sparse, colorless pellicules.

(3) Glucose-agar: Growth thin, cloudy to wrinkled, pale-brown to chestnut-brown; air mycelium velvety to wooly, pale-blue; substratum chestnut-brown.

(4) Glucose-asparagine-agar: Growth thin, cloudy, pale-yellow to greenish yellow; air mycelium slightly woolly, white, partially pale-blue.

(5) Calcium malate-agar: Growth thin, cloudy, pale-yellow; air mycelium initially velvety and white, locally velvety and pale-blue after 10 to 15 days.

(6) Gelatine stab (18° C): Growth very slow and sparse; substratum chestnut-brown to dark-brown; liquefaction after 15 days: about 1 cm.

(7) Starch plate: Growth thin, cloudy, white-yellow; air mycelium velvety to woolly, flour-white; hydrolysis after 5 days 5 mm, after 12 days 13 mm.

(8) Potatoes: Growth pustular, pale-brown; air mycelium thick woolly, initially white-grey, subsequently pale-blue; substratum chestnut-brown to dark-brown.

(9) Carrots: Growth sparse, punctiform to pustular; air mycelium sparse, chalky white.

(10) Litmus milk: Growth in the form of a thick, continuous wrinkled surface coating, chestnut-brown to dark-brown to brownish-pitch black; air mycelium sparse, greyish white; strong peptonisation but only very little coagulation; substratum dark-brown.

Furthermore, the strain NRRL 2860 reduces nitrates slowly to nitrites.

According to Ettlinger et al. (Archiv Mikrobiologie, 31, page 326, [1958]) the species of the genus Streptomyces are characterized by the color of the air mycelium, the morphology of the individual spores and spore chains, and finally by the melanoid coloration of peptone-containing nutrients. In these four respects the strain NRRL 2860 conforms with *Streptomyces viridochromogenes* (Krainsky) Waksman et Henrici and is, therefore, provisionally classified together with the latter species.

From the literature it is known that strains of *Streptomyces viridochromogenes* form the antibiotic chartreusin. Chartreusin is a yellow colored acid and has completely different properties from the colorless, neutral avilamycin.

Insofar as the manufacture of the avilamycin is concerned, the present invention is not restricted to the use of *Streptomyces viridochromogenes* NRRL 2860 or other strains corresponding to the above definition; it covers also any variant of said organisms such, for example, as are obtained by selection or mutation, more especially under the action of ultra-violet rays or X-rays or of nitrogen mustard oils.

To prepare avilamycin, a Streptomyces strain having the properties of *Streptomyces viridochromogenes* NRRL 2860 is aerobically grown, for example, in an aqueous nutrient containing an inorganic salt and a source of carbon and nitrogen, until the nutrient solution displays a substantial antibacterial activity, and the antibiotic avilamycin is then isolated from it.

The inorganic salt contained in the nutrient solution may be, for example, a chloride, nitrated, carbonate or sulfate of an alkali metal or alkaline earth metal, of magnesium, iron, zinc, or manganese. As examples of suitable nitrogen and carbon sources and growth promoting substances may be mentioned amino acids and mixtures thereof, peptides and proteins as well as their hydrolysates, such as peptone or tryptone, meat extracts, water-soluble ingredients of cereal grains, such as maize and wheat, of distillation radicals from the manufacture of alcohol, of yeast, beans, more especially of the soybean plant, of seeds, for example cotton seeds or of groundnuts and coconuts, furthermore glucose, saccharose, lactose, starches, mannitol, glycerine and the like.

The fungus is grown aerobically, for example in a quiescent surface culture or preferably submerged with shaking or sitrring with air or oxygen in shaking bottles or the known fermenters. Suitable temperatures are within the range of 18 to 40° C. Under these conditions the nutrient solution in general develops a substantial antibacterial activity after 1½ to 5 days.

The antibiotic can be isolated, for example, by the following methods: The mycelium is separated from the culture filtrate, whereupon the bulk of the antibiotic is found in the culture filtrate. However, considerable amounts of the antibiotic still remain adsorbed on the mycelium. It is, therefore, of advantage to wash the latter thoroughly, especially with an organic, at least partially water-soluble solvent such as an alcohol for example methanol, ethanol or a butanol, or a ketone such as acetone or methyl ethyl ketone. These mycelial extracts are added to the culture filtrate as they are or after having been concentrated under reduced pressure. The mixture is extracted with a water-immiscible organic solvent, such as an ester of a fatty acid of low molecular weight, for example ethyl acetate or amyl acetate, a hydrocarbon such as benzene, a chlorinated hydrocarbon such as ethylene chloride, methylene chloride or chloroform, a ketone such as methylpropyl ketone, methylamyl ketone or diisobutyl ketone, an alcohol such as a butanol or amyl alcohol, an ether, for example ethyl ether, diisopropyl ether or dibutyl ether, a glycol ether, or the like. Instead of performing a solvent extraction of the culture, or in combination with such a step as a further purification operation, the antibiotic can also be isolated by adsorption, for example on active carbon or an activated earth such as fuller's earth or floridine, and subsequent extraction of the adsorbate, for example with an organic solvent that is at least partially water-soluble, such as acetone, butanol or methylethyl ketone.

Alternatively, the culture can be extracted in the manner described above directly, that is to say without first separating the mycelium.

A further enrichment can be achieved by repeatedly extracting the organic extracts containing the antibiotic first with an acid aqueous solution having a pH value below 5 and then with an alkaline aqueous solution having a pH value over 8, which operation leaves the bulk of the antibiotic activity in the organic phase, from which the antibiotic avilamycin can then be isolated in the pure state by crystallization either as it is or after previous concentration.

A useful method of enrichment of the new antibiotic is distribution between an alcoholic aqueous solution and a water-immiscible solvent. The distribution is advantageously carried out by the counter-current method in an appropriate apparatus. Chromatography, for example on alumina, is likewise very suitable for the concentration. The crystalline form of the pure antibiotic is obtained, for example, from an organic solvent, such as acetone, methanol, ethanol, chloroform, or from a mixture of acetone and methanol, acetone and ether, or acetone and petroleum ether. For the recrystallization the same solvents are used or aqueous organic solutions, such as a dilute alcohol or dilute acetone.

Figure 2:
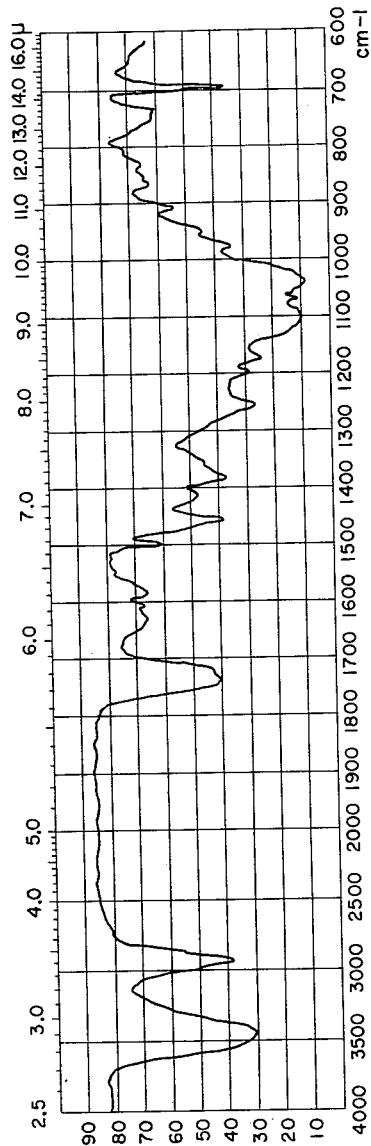

The new, neutral antibiotic is obtained in the form of colorless crystals which are of needle shape when a solvent mixture with acetone has been used. M.P. 188–189.5° C., optical rotation $[\alpha]_D^{20} = +0.8°$ (c.=1.165 in absolute ethanol) and $-7.7°$ (c.=1.083 in chloroform). The elementary analysis gives the following data: C=51.24%; H=6.54%; Cl=4.93%; O(calc.)=37.29%; $CH_3O$=8.79%; $(C)CH_3$=8.97% and active H=0.68%. According to Signer's method a molecular weight of 708 was found. These values correspond to the formula $C_{31}H_{47}O_{17}Cl$. The substance contains neither nitrogen nor sulfur. Its ultra-violet and infra-red absorption spectra are shown in FIGURES 1 and 2 respectively.

The new antibiotic produces no color reaction with alcoholic ferric chloride solution. The iodoform test is strongly positive, the Legal test being only slightly positive. Tetranitromethane is not colored.

Alkaline hydrolysis of the new antibiotic eliminates 1.80 molecular proportions of a volatile acid which migrates slightly farther in the paper chromatogramme (system:ethanol+ammonia+water 8:1:1) than acetic acid ($R_E$=1.20, related to acetic acid=1).

When the antibiotic is hydrolysed with a dilute mineral acid, for example with dilute sulfuric acid, three sugar-like reducing substances are split off which reveal in the paper chromatogramme (system: n-butanol+glacial acetic acid+water 4:1:1) $R_f$ values of 0.18, 0.41 and 0.52 respectively.

Antibiotics which, like the new antibiotic avilamycin, contain carbon, hydrogen, oxygen and chlorine but neither nitrogen nor sulfur, are relatively rare. The only known antibiotic of this kind is the exfoliatin described by Umezawa et al. (J. Antibiotics Japan 5, 466 (1952)). Although this substance is similar to avilamycin in certain respects (e.g. ultraviolet spectrum), there are the following distinct differences:

The empirical formula suggested for exfoliatin, $C_{27}H_{40}O_{19}Cl$, does not correspond to the analytical values found for avilamycin;

Exfoliatin has a lower melting point than avilamycin (172° C. as compared with 189° C.);

Exfoliatin, in contrast to avilamycin, gives a positive reaction with ferric chloride;

The infra-red spectra of exfoliatin and avilamycin show a few distinct differences. Exfoliatin and avilamycin can be easily distinguished by their behavior in paper chromatograph; with the fluxing agent, benzenechloroform, on paper impregnated with formamide, exfoliatin shows a $R_f$-value of 0.63 and avilamycin an $R_f$-value of 0.51.

In addition, the producer of exfoliatin, strain Z–3–5 (Jap. J. Med. Ser. 5, 466 (1952)) is quite different from strain NRRL 2860. The air mycelium of the exfoliatin-producer has whorls but not spirals, whereas strain NRRL 2860 forms no whorls but only spirals.

From these findings it is clear that avilamycin is not identical with the known antibiotic exfoliatin.

The antibiotic avilamycin displays a very high antibiotic action against various test organisms. When for the in-vitro tests dilution series (powers of 10) in glucose broth are used, which are incubated for 24 hours at 37° C., the following still inhibiting concentrations are observed:

| Test organism | Inhibiting concentration, μ grams per cc. |
|---|---|
| Micrococcus pyogenes, var. aures, penicillin-resistant | 10 |
| Streptococcus pyogenes | 0.1 |
| Streptococcus viridans | 10 |
| Streptococcus faecalis | 100 |
| Corynebacterium diphtheriae | 10 |
| Pasteurella pestis | 100 |
| Bacillus magatherium | 10 |
| Mycobacterium tuberculosis [1] | 100 |
| Trichomonas foetus [2] | 100 |

[1] Grown in Kirchner's synthetic medium with 5% of bovine albumen; growth inspected after two weeks.
[2] Grown in broth containing 10% of equine serum at 37° C.; growth inspected after 4 days.

In vivo the antibiotic avilamycin is likewise very active. After five subcutaneous administrations of 100 mg. and 33 mg. each per kg. of body weight to mice infected with Micrococcus pyogenes var. aureus, 100% and 75% respectively of survivals were observed. A similar curative result was recorded with mice infected with Streptococcus haemolyticus. The antibiotic is of little toxicity, since a single subcutaneous administration of 1000 mg. per kg. of body weight to mice aid no harm. Higher doses have not yet been tested.

Apart from providing processes for the manufacture of the antibiotic avilamycin, the present invention also concerns the said substance itself, as well as conversion products thereof obtained by hydrogenation or oxidation, as well as cleavage products such, for example, as are formed by hydrolysing the antibiotic.

The antibiotic avilamycin, the afore-mentioned conversion and cleavage products, or suitable mixtures thereof can be used as medicaments, for example in the form of pharmaceutical preparations which contain the afore-mentioned compounds in admixture with an organic or inorganic pharmaceutical excipient suitable for enteral, parenteral or local administration. As excipients are suitable such substances as do not react with the new compounds, for example gelatine, lactose, starches, magnesium stearate, talc, vegetable oils, benzyl alcohols, gums, polyalkylene glycols, white petroleum jelly, cholesterol or other known medicinal excipients. The pharmaceutical preparations may be, for example, tablets, dragees, powders, ointments, creams, suppositories or in liquid form solutions, suspensions or emulsions. They may be sterilized and/or contain assistants such as preserving, stabilizing, wetting or emulsifying agents. They may further contain other therapeutically useful substances.

The following examples illustrate the invention without thereby restricting its scope.

Example 1

A nutrient solution is prepared which contains 20 grams of meat meal, 20 grams of salt extract, 10 grams of calcium carbonate and 1 liter of tap water and adjusted to pH=7.2. This solution, or a multiple thereof, is charged into conical flasks of 500 cc. capacity (100 cc. of nutrient solution each) or into fermenters of 500 liters capacity (300 liters of nutrient solution each) and sterilized for 20 to 30 minutes under a pressure of 1 atmosphere (gauge). The contents of the flasks are then inoculated with up to 10% of a partially sporulating vegetative culture of *Streptomyces viridochromogenes* NRRL 2860 and incubated at 27° C. with thorough shaking or stirring, and in the fermenters with aerating with about 1 volume of sterile air per volume of nutrient solution per minute. The cultures are allowed to grow for 24-48 hours, mixed with about 1.5% of a filtration assistant and then filtered depending on the volume through a suction filter or a filter press or a rotary filter to free the antibiotically active aqueous solution from the mycelium and other solid constituents.

Example 2

When the medium described in Example 1 is replaced by any one of the nutrient media (a) to (c) described below, analogous sterilization, inoculation with *Streptomyces viridochromogenes* NRRL 2860, incubation at 27° C. and filtration likewise yield aqueous antibiotically active solutions.

(a) 10 grams of crude glucose, 5 grams of peptone, 3 grams of meat extract (Oxo Lab Lemco), 5 grams of sodium chloride, 10 grams of calcium carbonate and 1 liter of tap water; pH prior to sterilization: 7.5.

(b) 40 grams of groundnut groats, 10 grams of crude glucose, 200 mg. of secondary potassium hydrogen phosphate, 10 grams of calcium carbonate and 1 liter of tap water; pH prior to the addition of calcium carbonate: 7.5.

(c) 20 grams of coconut groats, 20 grams of malt extract, 10 grams of calcium carbonate and 1 liter of tap water; pH prior to the addition of calcium carbonate: 7.2.

Example 3

25 liters of a culture filtrate obtained as described in Example 1 or 2 are extracted with 10 liters of ethyl acetate and the extract is concentrated under reduced pressure to a volume of about 200 cc. The concentrated solution is shaken three times with 100 cc. of 0.5 N-aqueous acetic acid on each occasion. The separated aqueous phase is alkalinized with sodium carbonate solution and again shaken with ethyl acetate. The extract is washed, dried and evaporated in vacuo, to yield 19 mg. of a dry residue which is not capable of inhibiting the growth of *Bacterium subtilis* and *Staphylococcus aureus*.

After having freed the ethyl acetate extract from the bases in the manner described above, it is shaken three times with aqueous sodium carbonate solution, and the aqueous phase is acidified with hydrochloric acid and extracted with ethyl acetate. In the same manner as described above there are thus obtained from the solution 64 mg. of acids having no antibiotic activity.

The crude extract, after having been freed from the bases and acids, is finally washed with water, dried over sodium sulfate and evaporated in vacuo. The oily residue is mixed with petroleum ether, and the petroleum ether, which extracts only inactive constituents, is decanted. There remain 91 mg. of the crude antibiotic avilamycin which contains the whole of the activity of the original extract.

Example 4

90 liters of culture filtrate are extracted with 20 liters of ethyl acetate, and the extract is concentrated to 400 cc. When the concentrate is kept for 20 hours at 2° C., avilamycin precipitates in the form of a dense floccular substance which is filtered off. After having been dried in an exsiccator, the practically colorless crystal cake consisting of strongly felted small needles weighs 3.07 grams. The mother liquors are concentrated to about 200 cc. and mixed with twice the amount of ether. When the concentrate is kept for 4 days at 0° C., a further 3.28 grams of avilamycin crystallize out.

3.0 grams of the crystallizate are dissolved in 50 cc. of acetone, and a small amount of insoluble sludge is filtered off. The clear filtrate is mixed with ether and concentrated. On cooling, 2.0 grams of colorless fine needles crystallize out. Concentration of the mother liquors to about one quarter their volume produces a further 0.48 gram of crystals. For analysis a test portion of these crystals is recrystallized four times from acetone+ether and dried for 20 hours in a high vacuum at 70° C. The analytically pure antibiotic reveals the following data: M.P. 188–189.5° C. (determined under a microscope). Optical rotation $[\alpha]_D^{20} = +0.8°$ (c.=1.165 in absolute ethanol) or $-7.7°$ (c.=1.083 in chloroform).

Color reaction in alcoholic ferric chloride solution: negative. In concentrated sulfuric acid the antibiotic dissolves with an initially olive-brown coloration, but subsequently the solution turns violet-brown. Iodoform test: positive; Legal test: weakly positive. Tetranitromethane color reaction: negative. The elementary analysis reveals the following values: C=51.24%; H=6.54%; Cl=4.93%; $CH_3O$=8.79%; (C)$CH_3$=8.97%; active H=0.68%. Neither nitrogen nor sulfur can be detected. Determination of the molecular weight by the Signer method in chloroform with azobenzene as reference substance reveals it to be 708. These values correspond most closely to the empirical formula $C_{31}H_{47}O_{17}Cl$. Ultra-violet absorption spectrum in absolute alcohol: see FIGURE 1;

UV: maxima at 214 m$\mu$ (log $E_{1\,cm.}^{1\%}$=4.13); 280 m$\mu$ (log $E_{1\,cm.}^{1\%}$=2.88); 287 m$\mu$ (log $E_{1\,cm.}^{1\%}$=2.90)

infra-red absorption spectrum in potassium bromide: see FIGURE 2; bands at 3460; 2940; 1745; 1738; 1724; 1685; 1630; 1609; 1590; 1584; 1566; 1500; 1459; 1415; 1386; 1357; 1258; 1200; 1175; 1107; 1040; 980; 950; 910; 868; 855; 835; 810; 752; 739; 695; cm.$^{-1}$.

By alkaline hydrolysis 1.80 molecular proportions of volatile acid are split off which in the paper chromatogramme (system: ethanol+ammonia+water 8:1:1) produces a unitary spot and migrates a little farther than does acetic acid or propionic acid ($R_E$=1.20, related to acetic acid=1).

Example 5

The combined mother liquors of the crystallizations described in Example 4 are evaporated in vacuo and the residue is washed with petroleum ether. The matter which is insoluble in petroleum ether (5.8 grams) is taken up in benzene and chromatographed on a column of 170 grams of alumina (activity III). 200 cc. of benzene, 500 cc. of absolute chloroform and 500 cc. of chloroform+methanol mixture 99:1 elute only inactive by-products. The fractions eluted with 500 cc. of chloroform+methanol 97:3 and with 500 cc. of chloroform+methanol 9:1 contain the whole of the activity; on evaporation they yield 2.25 grams of a residue from which by crystallization 1.04 grams of pure avilamycin, melting at 187–188° C., are obtained.

Example 6

2.51 grams of crystalline avilamycin are treated with a solution of 1.5 grams of concentrated sulfuric acid in 30 cc. of water, and the whole is heated for 2 hours on a water bath at about 95° C. The cooled reaction mixture is free from lipophilic ingredients (850 mg. of brown oil) by being shaken with ether, and the aqueous phase is then percolated through a column of 70 cc. of Dowex 3 (OM-form). The neutral eluate is evaporated to dryness in vacuo, to yield 1.02 grams of a practically colorless, viscid oil.

Test portions of 300 mg. of this oil are subjected to paper chromatographic examination on filter paper Whatman No. 1 with the system n-butanol+glacial acetic acid+water in the volumetric ratio of 4:1:1. Development with aniline+phthalic acid and with ammoniacal silver nitrate solution reveals the presence of three reducing sugars, one having an $R_f$ value of 0.18 and giving a reddish color reaction with aniline-phthalic acid and the second having an $R_f$ value of 0.41 and giving a brownish-yellow aniline+phthalic acid reaction and the third having an $R_f$ value of 0.52 giving a reddish aniline-phthalic acid reaction.

The three sugars can be separated preparatively on a column of cellulose powder with the identical mixture of solvents. For 1.02 grams of sugar mixture a column of cellulose powder 3 cm. in diameter and 42 cm. high is used. The eluates are collected in fractions of 16 cc. Fractions 19–20 yield 330 mg. of the paper-chromatographically unitary sugar of $R_f$ 0.52 as a viscid oil. Fractions 21–22 yield 348 mg. of the same sugar in admixture with that of $R_f$ 0.41. The unitary second sugar is obtained in a yield of 93 mg. from fractions 23 and 24 of the chromatogram. Of the compound of $R_f$ 0.18 340 mg. are obtained from fractions 27–32.

What is claimed is:

1. Process for the manufacture of an antibiotic, which comprises cultivating *Streptomyces viridochromogenes* NRRL 2860 in an aqueous nutrient solution containing inorganic salts, and a source of carbon and nitrogen, under aerobic conditions until the nutrient solution displays a substantially antibacterial activity, and the antibiotic avilamycin is then isolated.

2. Process as claimed in claim 1, wherein the nutrient solution contains growth-promoting substances.

3. Process as claimed in claim 1, wherein cultivation is carried out for 24 to 120 hours at a temperature between 18 and 40° C.

4. Process as claimed in claim 1, wherein the antibiotic is extracted from the culture filtrate with an organic, water-immiscible solvent.

5. Process as claimed in claim 1, wherein the antibiotic is extracted from the separated mycelium with an organic, at least partially water-miscible solvent.

6. Process as claimed in claim 1, wherein the antibiotic is purified by adsorption, and extraction from the adsorbate with an organic, at least partially water-soluble solvent.

7. Process as claimed in claim 1, wherein the antibiotic is purified by distribution between an aqueous solution and an organic, water-immiscible solvent.

8. Process as claimed in claim 1, wherein distribution is carried out by the countercurrent process.

9. Process as claimed in claim 1, wherein the antibiotic is purified by chromatography.

10. Process as claimed in claim 1, wherein the antibiotic is purified by chromatography on aluminum oxide.

11. Process as claimed in claim 1, wherein the antibiotic is obtained in crystalline form from an organic solvent.

12. The antibiotic avilamycin, a neutral substance forming colorless crystals, melting at 188–189.5° C., showing the optical rotations $[\alpha]_D^{20}=+0.8°$ (c.=1.165) in absolute ethanol and $[\alpha]_D^{20}=-7.7°$ (c.=1.083) in chloroform, giving in elementary analysis the following data: C=51.24%; H=6.54%; Cl=4.93%; O(calc.)= 37.29%; $CH_3O$=8.79%; $C(CH_3)$=8.97%; active H= 0.68%; containing neither nitrogen nor sulfur; having a molecular weight of 708 (Signer's method) suggesting the formula $C_{31}H_{47}O_{17}Cl$, exhibiting in absolute ethanol the UV-spectrum shown in FIGURE 1 and in potassium bromide the IR-spectrum shown in FIGURE 2, yielding in hydrolysis with dilute mineral acid three sugar-like reducing substances which reveal in the paper chromatogramme (system: n-butanol+glacial acetic acid+water 4:1:1) $R_f$ values of 0.18, 0.41 and 0.52 respectively.

13. The sugar-like substances obtained in the hydrolysis of the antibiotic of claim 12 wtih dilute mineral acids and which reveal in the paper chromatogramme (system: n-butanol+glacial acetic acid+water 4:1:1) $R_f$ values of 0.18, 0.41 and 0.52 respectively.

References Cited in the file of this patent

UNITED STATES PATENTS 3,015,607     Cataldi et al. _____ Jan. 2, 1962.